United States Patent
Polcuch

(12) 
(10) Patent No.: US 6,922,991 B2
(45) Date of Patent: Aug. 2, 2005

(54) REGULATED PRESSURE SUPPLY FOR A VARIABLE-DISPLACEMENT REVERSIBLE HYDRAULIC MOTOR

(75) Inventor: Eric A. Polcuch, San Pedro, CA (US)

(73) Assignee: Moog Inc., East Aurora, NY (US)

( * ) Notice: Subject to any disclaimer, the term of this patent is extended or adjusted under 35 U.S.C. 154(b) by 161 days.

(21) Appl. No.: 10/648,902

(22) Filed: Aug. 27, 2003

(65) Prior Publication Data

US 2005/0045028 A1 Mar. 3, 2005

(51) Int. Cl.$^7$ .............................................. F16B 31/02
(52) U.S. Cl. ................................... 60/468; 60/489
(58) Field of Search .................... 60/468, 469, 489; 91/433, 468

(56) References Cited

U.S. PATENT DOCUMENTS

| | | | | | |
|---|---|---|---|---|---|
| 3,625,007 A | * | 12/1971 | Herndon | ...................... | 60/469 |
| 4,768,340 A | * | 9/1988 | Hamilton | ...................... | 60/489 |
| 5,590,525 A | * | 1/1997 | Kandil | ...................... | 60/468 |
| 5,992,148 A | * | 11/1999 | Satake | ...................... | 60/468 |

* cited by examiner

Primary Examiner—F. Daniel Lopez
(74) Attorney, Agent, or Firm—Phillips Lytle LLP

(57) ABSTRACT

A pressure-control device (20) includes a controllable variable-displacement reversible hydraulic motor (21) having a pressure port (22) and a return port (23); a source of pressurized fluid ($P_s$); a fluid return (R); and a pressure regulating valve (24) operatively interposed between the source, return and pressure port. The pressure regulating valve is operatively arranged to maintain a predetermined pressure at the pressure port regardless of the direction of flow through the pressure port.

13 Claims, 2 Drawing Sheets

REGULATED PRESSURE SUPPLY FOR A VARIABLE-DISPLACEMENT REVERSIBLE HYDRAULIC MOTOR

TECHNICAL FIELD

The present invention relates generally to servomechanisms and components thereof, and, more particularly, to an improved regulated pressure supply for a variable-displacement reversible hydraulic motor.

BACKGROUND ART

Servo-controlled variable-displacement reversible hydraulic motors are frequently used to actuate secondary aircraft control surfaces, such as wing leading edge and trailing edge flaps, leading edge slats, door systems and the like, because of their hydraulic power efficiency. Such motors are typically connected to the aircraft's pressure supply line and to the return line. In such an arrangement, servocontrol of motor displacement determines the magnitude and direction of the motor output torque. These motors are typically supplied with a constant hydraulic supply pressure, and are controlled to produce a desired output torque by means of adjustment of a tiltable swashplate to change the motor displacement. In a reversible motor, the swashplate can be tilted in either direction through a zero-displacement centered position to produce both positive and negative torque. This capability is often referred to as "over-center" control.

In a typical application, the driven control surface, when deflected outwardly into an airstream, imposes a spring-like load. In general, the driving torque increases with outward surface deflection into the airstream. However, when the control surface is returned from such deflected position, the energy in the aerodynamic spring must be dissipated in the hydraulic system. In presently known systems, fluid from the motor pressure port is driven back into the pressure supply line and the motor return port draws fluid from the return line. Both of these conditions are undesirable as contamination may be introduced into the pressure supply system, and the return line may cavitate. A preferable arrangement under this condition would allow fluid from the pressure port to be bypassed directly to the motor return port.

DISCLOSURE OF THE INVENTION

The present invention selectively communicates the motor pressure and return ports by introducing a pressure regulating valve in the motor supply line. In its simplest form, a pressure regulating valve is a three-way spool valve with throttlable supply pressure and return ports alternately connecting to an output pressure port. The output pressure is fed back to one spool end chamber and a reference pressure is supplied to the other spool end chamber. The valve will act to cause the output pressure to equal the reference pressure, regardless of the magnitude and direction of flow into or out of the output port. While the pressure regulating valve is a well-known device, its use in conjunction with a variable-displacement hydraulic motor is novel.

Another aspect of the invention is the utilization of the necessary high flow capability of the pressure regulating valve to replace the pressure shutoff/bypass valve (typically, a two-stage solenoid-operated valve) usually required in such applications. This can be implemented very simply by connecting the output port of a three-way solenoid pilot valve to supply the reference pressure for the pressure regulating valve. When the reference pressure is switched to return, the output of the pressure regulating valve will also be held at return, thus shutting off motor operation and providing bypassing flow between the two motor ports.

With parenthetical reference to the corresponding parts, portions or surfaces of the disclosed embodiment, merely for purposes of illustration and not by way of limitation, the present invention broadly provides an improved pressure-control device (20). The improved device broadly includes a controllable variable-displacement reversible hydraulic motor (21) having a pressure port (22) and a return port (23); a source of pressurized fluid ($P_s$); a fluid return (R) and a pressure regulating valve (24) operatively interposed between the source, return and pressure port, the valve being operatively arranged to maintain a predetermined pressure at the pressure port regardless of the direction of flow through the pressure port. In this regard, flow from the pressure regulating valve into the pressure port represents a positive motor displacement to move an "opposing" load, whereas flow from the pressure port to the pressure regulating valve characterizes the condition of an "aiding" load.

In the preferred embodiment, the motor may include a variable-angle servo-controlled swashplate. The pressure regulating valve may preferably be a three-way valve, preferably having a valve spool, arranged to connect either supply pressure or return to the motor pressure port. In this configuration, the valve has a first spool end chamber (28) communicating with the motor pressure port, and has a second spool end chamber (29). Means are provided in, or associated with, the second spool and chamber for biasing the valve spool to move in a direction to increase pressure at the motor pressure port. The biasing means may include a spring in the second spool end chamber, or may be a reference fluid pressure supplied from the source. The regulating valve will inherently act to cause the motor pressure to be proportional to the biasing force or equal to the reference pressure, irrespective of the direction of flow in or out of the motor pressure port.

In another embodiment, a solenoid-operated pilot valve may be introduced in the connection to the second spool end chamber so that the reference pressure maybe selected to be the supply pressure or the return pressure so as to cause the motor to be operated at full pressure or alternatively to be shut off and bypassed at return pressure.

Accordingly, the general object of the invention is to provide an improved regulated pressure supply for a variable-displacement reversible hydraulic motor.

Another object is to provide a solenoid-operated motor shut-off capability without the addition of a separate high-flow shut-off valve.

These and other objects and advantages will become apparent from the foregoing and ongoing written specification, the drawings, and the appended claims.

DESCRIPTION OF THE PREFERRED EMBODIMENTS

Figure 1:
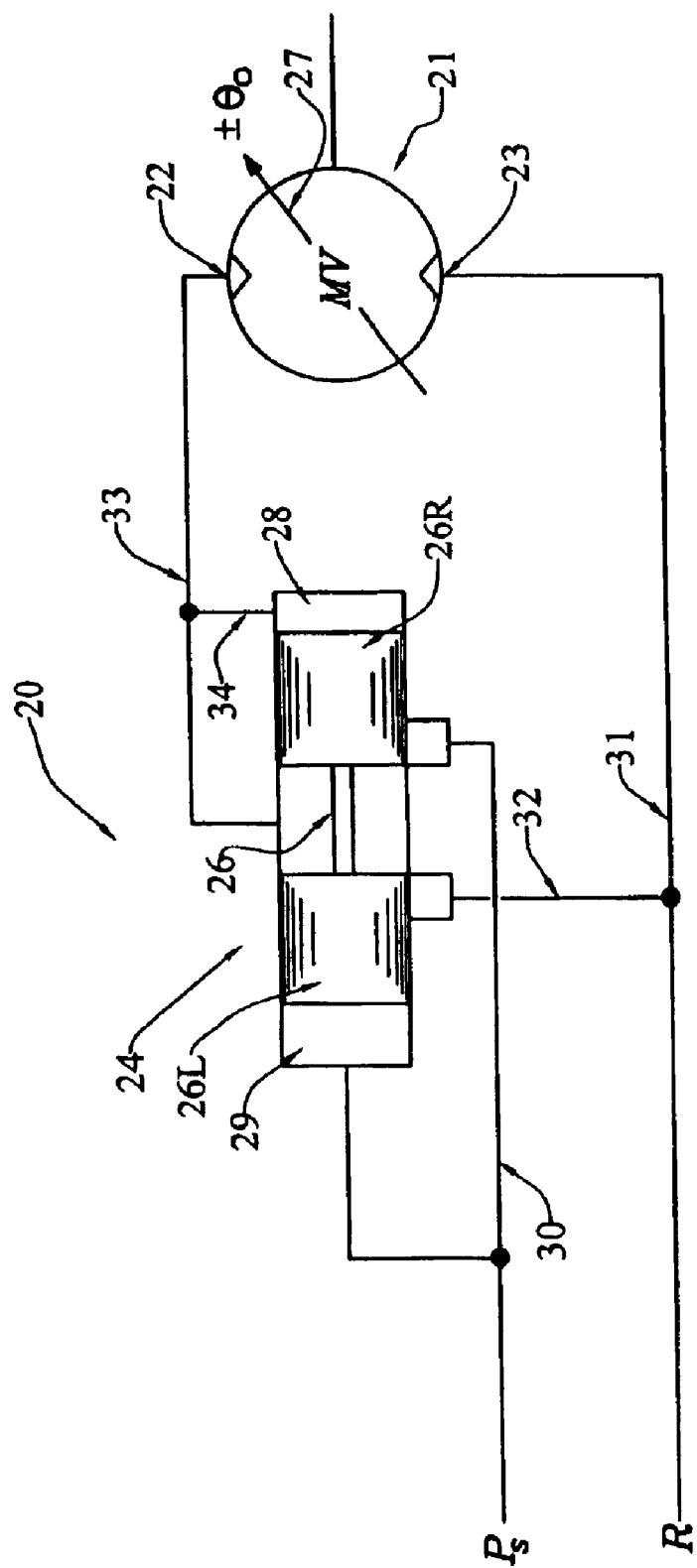
FIG. 1 is a schematic view of the improved pressure-control device connected to a variable-displacement reversible hydraulic motor.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

First Embodiment (FIG. 1)

Referring now to FIG. 1, the present invention broadly provides an improved pressure-control device, of which a presently-preferred form is generally indicated at 20. Device 20 is shown as broadly including a controllable variable-displacement reversible hydraulic motor 21 having a pressure port 22 and a return port 23; a source of pressurized fluid $P_s$; a fluid return R; and a pressure regulating valve, generally indicated at 24.

The hydraulic motor may be of the type having a swashplate, schematically indicated by the symbol 27, the angle of which is controllable.

The pressure regulating valve 24 is shown as being a three-way valve having a two-lobed valve spool 26. The valve has a right spool end chamber 28 and a left spool end chamber 29. Pressurized fluid from the source is provided via line 30 to a port on the pressure regulating valve which is normally covered by the right spool lobe 26R. Another conduit 31 communicates the motor return port 23 with the fluid return. A branch conduit 32 communicates with a port that is normally covered by the left spool lobe 26L. A conduit 33 communicates the space between the left and right valve spool lobes with the motor pressure port. A branch conduit 34 communicates spool right end chamber 28 with conduit 33. Hence, the pressure in right end chamber 28 is the same as the pressure between lobes 26L, 26R.

The spool left end chamber 29 is connected to the supply pressure $P_s$ via conduits 30 and 42. If the output pressure in line 33 is reduced (due to flow into the motor) the pressure difference between end chambers 28, 29 displaces the valve spool rightwardly from the position shown. This displacement opens the port shown as being covered by the right spool lobe, and allows fluid to flow from the source via conduits 30, 33 to the motor pressure port. As the motor inlet pressure equalizes with the supply pressure, spool 26 will be displaced leftwardly so that the right spool lobe just closes the port connecting to the supply line 30.

A suitable mechanism (not shown) is associated with the motor to control the angle of the swashplate, schematically indicated at θ in FIG. 1. When the swashplate is displaced to produce motor torque to displace a control surface to displace against an aerodynamic load, flow will be required into the motor pressure port as the motor rotates. This flow will be provided by the pressure regulating valve spool moving rightwardly to uncover the port connecting to pressure line 30 until the surface is displaced to a point where the aerodynamic load is equal to the motor torque, at which time the port will be closed again.

If the swashplate is then moved to reduce the motor displacement to allow the outwardly-displaced control surface to move back toward its undisplaced position, the aerodynamic load will now be "aiding" the surface motion and the motor will displace fluid out of the pressure port, tending to drive the pressure in line 33 above supply pressure. This increased pressure acting on the right end of the regulating valve will displace the valve spool leftwardly from the position shown, blocking flow between conduits 30, 33, and permitting a restricted bypass flow of fluid from the motor pressure port 22 to the motor return port 23 via conduits 33, 32 and 31. Thus, in the case of an "aiding" load, the bypass flow does not flow back to the fluid source, and no fluid is drawn into the system from the return.

Figure 2:
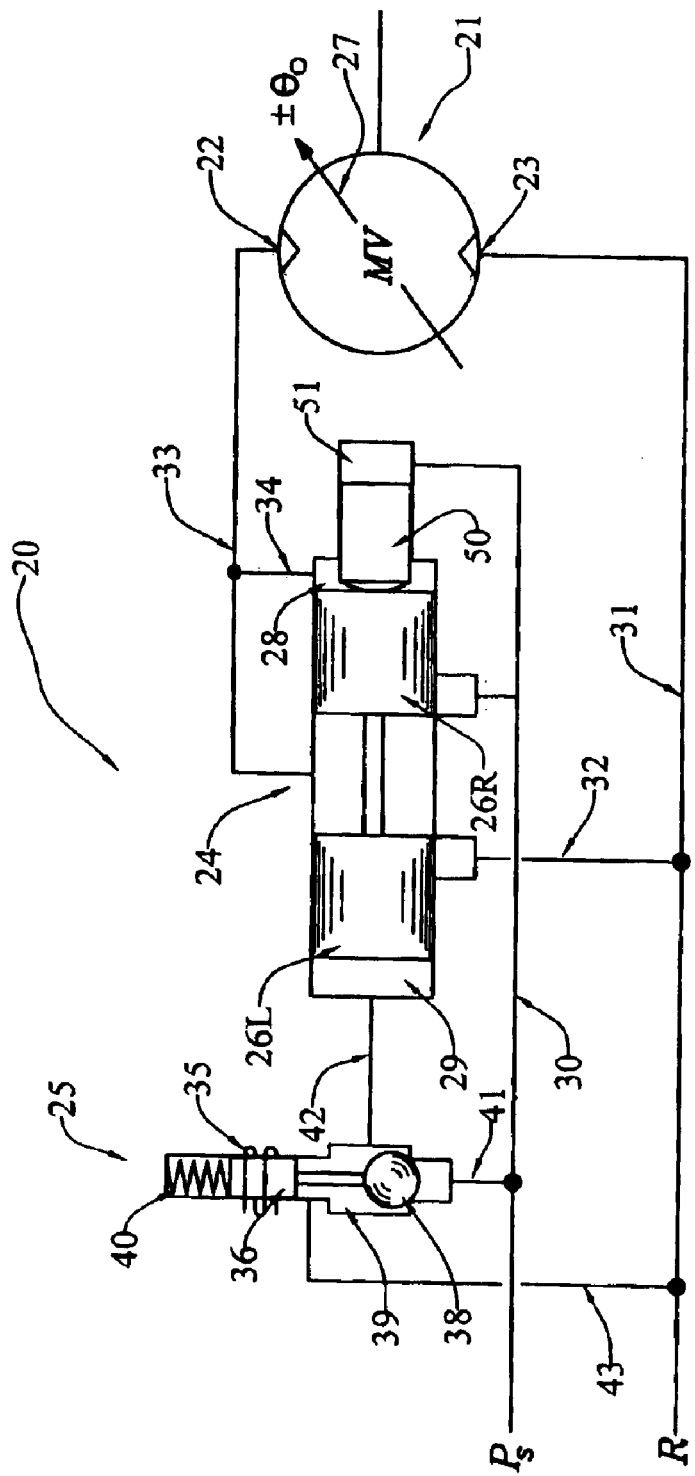
FIG. 2 is a schematic view of the solenoid-operated pilot valve in conjunction with the improved pressure-control device.

Second Embodiment (FIG. 2)

It is usually desirable to be able to positively disable a motor control system such as the one just described, and this typically requires a two-stage solenoid-operated high-flow pilot valve that removes pressure from the motor and provides a free-flow bypass to allow the motor to be back-driven. In a second form of the invention, the pressure regulating valve may be utilized in a shut-off/bypass mode by simply adding a solenoid pilot valve 25 to selectively control the reference pressure applied to the pressure regulating valve spool end chamber 29, as shown in FIG. 2.

The solenoid-operated pilot valve 25 is shown as having a coil 35, a plunger 36, a ball 38 arranged for movement within a chamber 39 for movement between two seats, and a spring 40 urging the plunger to move downwardly so as to prevent flow between conduits 41, 42. Branch conduit 41 communicates conduit 30 with the port below the ball, and branch conduit 42 communicates ball chamber 39 with the spool left end chamber 29. Conduit 43 communicates chamber 39 with return conduit 31.

When the apparatus is in the condition shown in FIG. 2 (i.e., with the solenoid de-energized) and a current $i_{sol}$ is then supplied to the pilot valve, plunger 36 is drawn upwardly allowing ball 38 to sealingly engage the upper seat in ball chamber 39. This blocks flow through conduit 43, and charges the spool left end chamber 29 to the supply pressure $P_s$ via now-connected conduits 39, 41 and 42. The pressure regulating valve 24 will then function, as described earlier with respect to FIG. 1, to control the pressure supply to the motor pressure port 22.

However, while its pressure regulating function is unchanged, the valve 24 has been modified somewhat from that shown in FIG. 1. An auxiliary piston 50 has been added in chamber 28 and is loaded by $P_s$ acting in chamber 51 to load against the right end of the valve spool 24. The purpose of this change to the valve is to ensure positive shutoff and bypassing when the solenoid valve is de-energized and end chamber 29 is depressurized. Even if the regulated pressure in line 33 drops to return, the valve could conceivably be subject to contamination induced sticking near it null position and thus prevent free bypassing of the motor. The continued presence of $P_s$ in chamber 51 provides a large positive force to reliably drive the valve spool to the full-open bypassing position.

The addition of piston 50 does not in anyway alter the pressure regulating function of the valve. When the piston 50 is loaded against the right end of valve 24 with pressure $P_s$ also applied to the left end in chamber 29, the effect is to reduce, by the area of piston 50, the effective area to which the regulated pressure in line 33 is applied. This represents a change in the feedback gain of the regulator, but it can be compensated for by an overall increase in the valve spool diameter, if desired.

The present invention contemplates that many changes and modifications may be made. For example, other types of equivalent valves and motors may be substituted or modified, as desired. Therefore, while a presently-preferred form of the improved pressure-control-device has been shown and described, and various changes and modifications thereof-discussed, persons skilled in this art will readily appreciate that various additional changes and modifications may be made without departing from the spirit of the invention, as defined and differentiated by the following claims.

What is claimed is:

1. A pressure-control device, comprising:
   a controllable variable-displacement hydraulic motor having a pressure port and a return port;
   a source of pressurized fluid;
   a fluid return; and
   a pressure regulating valve operatively interposed between said source, return and pressure port, said valve being operatively arranged to maintain a predetermined pressure at said pressure port regardless of the direction of flow through said pressure port.

2. The pressure-control device as set forth in claim 1 wherein said motor includes a variable-angle swashplate.

3. The pressure-control device as set forth in claim 1 wherein said valve is a three-way valve.

4. The pressure-control device as set forth in claim 3 wherein said valve has a valve spool.

5. The pressure-control device as set forth in claim 4 wherein said valve has a first spool end chamber communicating with said pressure port.

6. The pressure-control device as set forth in claim 5 wherein said valve has a second spool end chamber, and means associated with said second spool end chamber for biasing said valve spool to move in a direction to increase the pressure at said pressure port.

7. The pressure-control device as set forth in claim 6 wherein said biasing means includes a spring in said second spool end chamber.

8. The pressure-control device as set forth in claim 6 wherein said biasing means is the pressure of fluid in said second spool end chamber.

9. The pressure-control device as set forth in claim 8 and further comprising a 3-way pilot valve operatively arranged between said source, return and second spool end chamber.

10. The pressure-control device as set forth in claim 9 wherein the pressure at said second spool end chamber is selectively one of said source and return pressures.

11. The pressure-control device as set forth in claim 9 wherein said pressure regulating valve has a piston means associated with said first spool end chamber for biasing said valve spool to move in a direction to decrease the pressure at said pressure port, said piston means being loaded by said source pressure.

12. The pressure-control device as set forth in claim 8 wherein the pressure in said second spool end chamber is said predetermined pressure.

13. The pressure-control device as set forth in claim 1 wherein when the fluid flow is out of said pressure port, such flow is directed to said motor return port.

* * * * *